(12) United States Patent
Kang et al.

(10) Patent No.: US 7,768,770 B2
(45) Date of Patent: Aug. 3, 2010

(54) CONNECTING STRUCTURE BETWEEN ELECTRODE AND LEAD, ELECTRIC DOUBLE LAYER CAPACITOR HAVING THE SAME, AND METHOD FOR MANUFACTURING THE CAPACITOR

(75) Inventors: Jin-A Kang, Chungcheongnam-do (KR); Hee-Young Lee, Gyeonggi-do (KR)

(73) Assignee: LS Mtron Ltd., Anyang (KR)

( * ) Notice: Subject to any disclaimer, the term of this patent is extended or adjusted under 35 U.S.C. 154(b) by 186 days.

(21) Appl. No.: 11/704,662

(22) Filed: Feb. 9, 2007

(65) Prior Publication Data
US 2007/0188978 A1    Aug. 16, 2007

(30) Foreign Application Priority Data
Feb. 14, 2006    (KR) .................. 10-2006-0014204

(51) Int. Cl.
*H01G 9/00* (2006.01)
(52) U.S. Cl. ...................................... 361/502; 361/503
(58) Field of Classification Search ......... 361/502–503; 29/25.03
See application file for complete search history.

(56) References Cited

U.S. PATENT DOCUMENTS 6,083,644 A    7/2000    Watanabe

FOREIGN PATENT DOCUMENTS

| CN | 1188335 A | 7/1998 |
|---|---|---|
| JP | 02-277217 | 11/1990 |
| JP | 07122467 A * | 5/1995 |
| JP | 09017695 A * | 1/1997 |
| JP | 2000-150306 | 5/2000 |
| JP | 2001-118751 | 4/2001 |
| JP | 2001118751 A * | 4/2001 |
| JP | 2001-237150 | 8/2001 |
| JP | 2003-115286 | 4/2003 |
| JP | 2004-247579 | 9/2004 |
| JP | 2004247579 A * | 9/2004 |
| JP | 2005-223197 | 8/2005 |
| KR | 10-2004-58921 | 7/2004 |

* cited by examiner

*Primary Examiner*—Eric Thomas
(74) *Attorney, Agent, or Firm*—Jones Day

(57) ABSTRACT

A connecting structure of a lead wire is electrically connected to an electrode in which a polarized electrode layer is formed on a surface of a current collector plate. A region of the electrode, to which the lead wire is to be joined, is free from the polarized electrode layer. The lead wire is joined to the current collector plate by means of stitching and then compressed thereto. This connecting structure may keep a capacitance of a capacitor and improve contact reliability. An electric double layer capacitor having the structure and a method for manufacturing the capacitor are also provided.

9 Claims, 4 Drawing Sheets

CONNECTING STRUCTURE BETWEEN ELECTRODE AND LEAD, ELECTRIC DOUBLE LAYER CAPACITOR HAVING THE SAME, AND METHOD FOR MANUFACTURING THE CAPACITOR

BACKGROUND OF THE INVENTION

1. Field of the Invention

The present invention relates to a connecting structure between an electrode and a lead, an electric double layer capacitor having the structure, and a method for manufacturing the capacitor, and more particularly to a connecting structure between an electrode and a lead, which may keep a capacitance of a capacitor and improve contact reliability, an electric double layer capacitor having the structure, and a method for manufacturing the capacitor.

2. Description of the Related Art

An ultra capacitor has a capacitance at least 300 times of that of a conventional capacitor. In addition, the ultra capacitor may store a relatively smaller amount of energy than a battery, but it may supply an instantaneous peak power within a very short time about 10 to 100 times of a battery. Thus, the ultra capacitor is used as an energy device that substitutes or supplements a battery.

An electric double layer capacitor, one of ultra capacitors, stores charges in an ionic layer, so-called an electric double layer, formed in an interface of electrolyte by using the electricity storing mechanism, different from a battery that uses chemical reactions. That is to say, the ultra capacitor stores electricity in a way of physical charge accumulation. Thus, the ultra capacitor does not exhibit any deterioration caused by repeated uses and has no limitation in its life cycle. Considering the above features, the ultra capacitor is used as an energy device that requires a long time use without needing a large amount of energy.

In a general electric double layer capacitor, positive and negative electrode foils and corresponding lead wires are joined by means of supersonic welding, caulking or compressing.

Junctions made by supersonic welding are advantageous in low resistance since metals are coupled with each other. However, the supersonic welding junctions are not advantageous in that a sufficient junction force is not ensured due to the effects of a dielectric oxide layer formed on a surface of the positive electrode foil. In addition, there is another problem that impurities caused by sparks generated during the supersonic welding process are adhered to the supersonic welding junctions.

Junctions made by caulking are advantageous since they may give a sufficient junction force. However, there is a problem that a relatively high contact resistance is caused between the positive and negative electrode foils and the lead wires.

Junctions made by compression show a low contact resistance since metals may be closely coupled with each other, similarly to the supersonic welding. However, there is a problem that they give a lower junction force than the supersonic welding junctions and the caulking junctions.

SUMMARY OF THE INVENTION

The present invention is designed to solve the problems of the prior art, and therefore it is an object of the present invention to provide a connecting structure between an electrode and a lead wire, which may minimize a contact resistance between an electrode and a lead wire of a capacitor by minimizing an electric resistance between the electrode and the lead of the capacitor and improving contact reliability of the lead wire; an electric double layer capacitor having the capacitor; and a method for manufacturing the capacitor.

In order to accomplish the above object, the present invention provides a connecting structure of a lead wire electrically connected to an electrode in which a polarized electrode layer is formed on a surface of a current collector plate, wherein a region of the electrode, to which the lead wire is to be joined, is free from the polarized electrode layer, and the lead wire is joined to the current collector plate by means of stitching and then compressed thereto.

Preferably, at least one lead wire is attached to the current collector plate. In addition, a contact area between the electrode and the lead wire is preferably in the range of 10 mm$^2$ to 300 mm$^2$. Here, at least three stitching pins are preferably provided to the lead wire junction region. Also, each pinhole preferably has a diameter of 0.2 mm to 5 mm.

Meanwhile, a region, which is opposite to the region of the electrode to which the lead wire is to be joined, may also be free from the polarized electrode layer. Here, the polarized electrode layer is preferably an activated carbon coating layer.

A surface distance of the separator (i.e., a distance measured along a surface of the separator) between the negative electrode lead wire and the positive electrode lead wire is preferably in the range of 0.3 cm to 30 cm.

In another aspect of the present invention, there is also provided an electric double layer capacitor including a positive electrode and a negative electrode in each of which a polarized electrode layer is formed on a surface of a current collector plate, a positive electrode lead wire and a negative electrode lead wire respectively connected to the positive and negative electrodes, a separator interposed between the positive and negative electrodes, and an electrolyte soaked into the separator, wherein a region of each electrode, to which the lead wire is to be joined, is free from the polarized electrode layer, and each lead wire is joined to the current collector plate by means of stitching and then compressed thereto.

Preferably, at least one positive or negative electrode lead wire is joined to each electrode. Also, a contact area between each electrode and the positive or negative electrode lead wire is preferably in the range of 10 mm$^2$ to 300 mm$^2$. In addition, at least three stitching pins are preferably provided to each lead wire junction region. Each pinhole preferably has a diameter of 0.2 mm to 5 mm.

Meanwhile, a region, which is opposite to the region of the electrode to which the lead wire is to be joined, may also be free from the polarized electrode layer. Here, the polarized electrode layer is preferably an activated electrode coating layer.

Preferably, the positive and negative electrodes to which the positive and negative electrode lead wires are respectively joined are arranged to be spaced apart by a predetermined distance based on the separator in a direction along which the positive and negative electrodes are symmetric. In addition, the separator and the electrodes are preferably taken up along a length direction thereof into a roll shape. Here, a location (L) of each lead wire, defined by the following equation, is preferably greater than 0.1 and smaller than 1.

Preferably, a surface distance of the separator (i.e., a distance measured along a surface of the separator) between the negative electrode lead wire and the positive electrode lead wire is in the range of 0.3 cm to 30 cm. In addition, a linear distance between the negative electrode lead wire and the positive electrode lead wire is preferably in the range of 5 mm to 30 mm after the separator and the electrodes are taken up.

Also preferably, the negative electrode is positioned relatively outer than the positive electrode based on a center of the taken-up roll.

In still another aspect of the present invention, there is also provided a method for manufacturing an electric double layer capacitor, which includes the steps of: (a) preparing a positive electrode and a negative electrode by coating polarized electrode layers on a positive current collector plate and a negative current collector plate except regions to which lead wires are to be joined; (b) stitching lead wires to the regions of the positive and negative electrodes to which lead wires are to be joined, and then compressing the lead wires thereto; (c) taking up the positive and negative electrodes, to which the lead wires are joined, into a roll shape with interposing a separator between the positive and negative electrodes; and (d) soaking an electrolyte into the separator.

Preferably, regions, which are opposite to the regions to which the lead wires are to be joined, are free from the polarized electrode layer.

Preferably, the step (c) includes the steps of: positioning the positive electrode and the negative electrode in a symmetric direction based on the separator; and taking up the positive electrode, the negative electrode and the separator into a roll shape so that the negative electrode is positioned outward.

While the positive and negative electrodes are positioned, a surface distance of the separator (i.e., a distance measured along a surface of the separator) between the negative electrode lead wire and the positive electrode lead wire is preferably controlled in the range of 0.3 cm to 30 cm. In addition, at least three pins are preferably used for joining the lead wire by stitching. More preferably, a pinhole is formed in a size of 0.2 mm to 5 mm when the lead wire is joined by means of stitching. In addition, a pressure of 0.3 Mpa or above is preferably applied when the lead wire is compressed.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
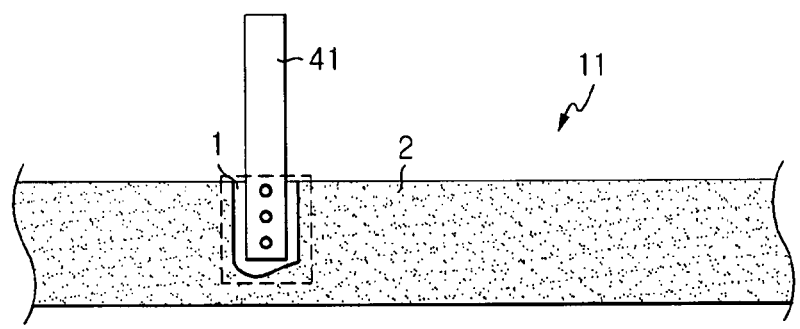
FIG. 1 is a plane view showing a developed state of an electrode of an electric double layer capacitor according to a preferred embodiment of the present invention.
Figure 2:
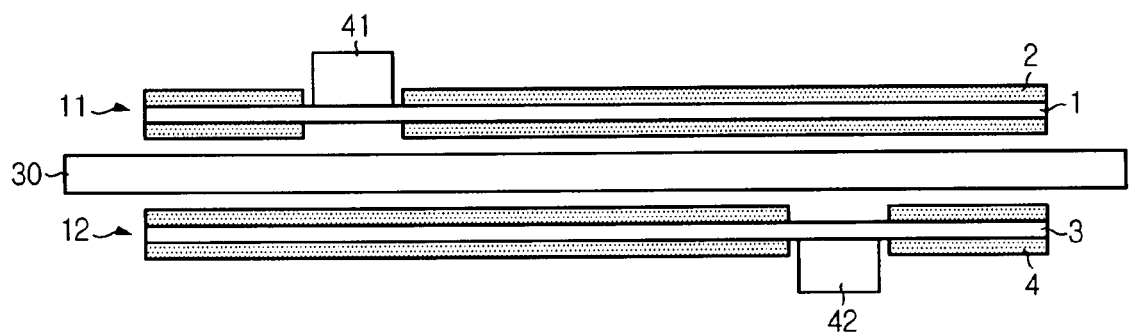
FIG. 2 is a sectional view showing a developed state of an electrode provided to the electric double layer capacitor according to the preferred embodiment of the present invention.
Figure 3:
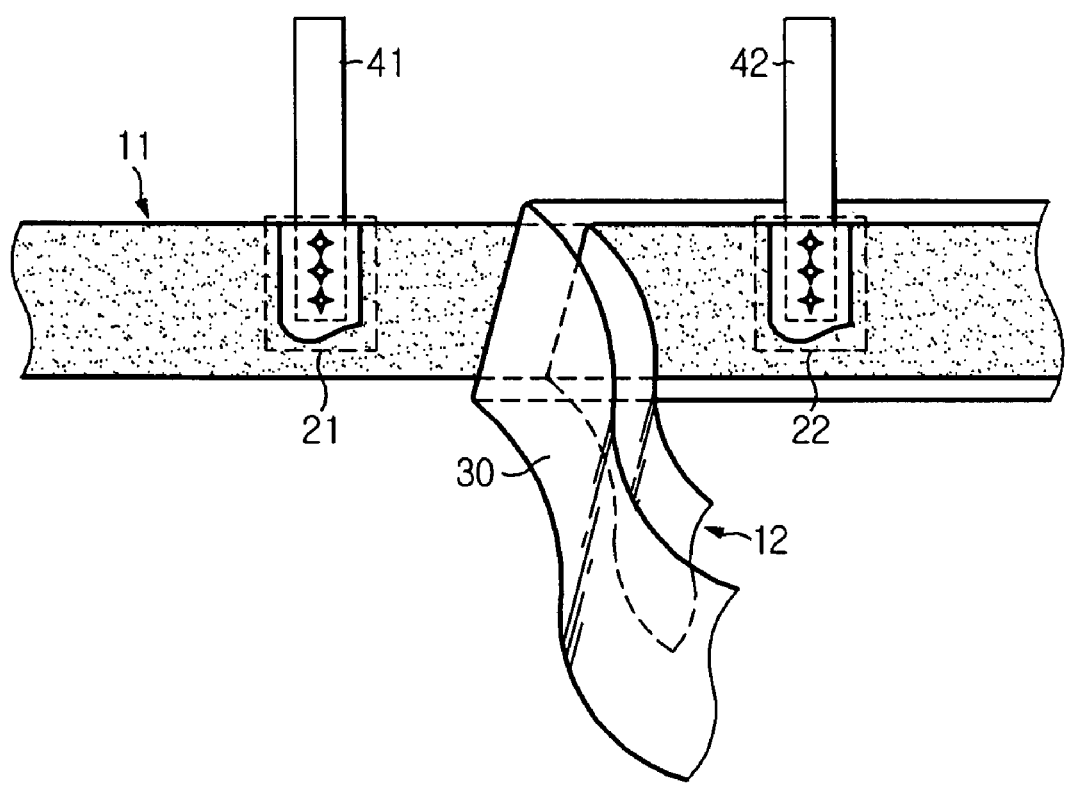
FIG. 3 is a partially sectioned view showing a separator of the electric double layer capacitor according to the preferred embodiment of the present invention.

FIG. 1 is a plane view showing a developed state of an electrode of an electric double layer capacitor according to a preferred embodiment of the present invention. FIG. 2 is a sectional view showing a developed state of the electrode provided to the electric double layer capacitor according to the preferred embodiment of the present invention. FIG. 3 is a partially sectioned view showing a separator of the electric double layer capacitor according to the preferred embodiment of the present invention.

Referring to FIGS. 1 to 3, the electric double layer capacitor of this embodiment includes a positive electrode 11 and a negative electrode 12 having polarized electrode layers 2, 4 formed on surfaces of current collector plates 1, 3; lead wires 41, 42 attached to the electrodes 11, 12 respectively; and a separator 30 interposed between the electrodes 11, 12.

The positive electrode 11 includes the positive current collector plate 1 and the polarized electrode layer 2. Here, the positive current collector plate 1 is a common metal foil, and it is made of conductive material in a tape shape. In addition, the polarized electrode layer 2 formed on the surface of the positive current collector plate 1 is composed of an activated carbon coating layer. Also, a surface region of the positive current collector plate 1, to which a positive electrode lead wire 41 is attached, is preferably free from the polarized electrode layer 2.

Furthermore, a surface region of the positive current collector plate 1, opposite to the above surface region to which the positive electrode lead wire 41 is attached, is also preferably free from the polarized electrode layer 2.

Meanwhile, when the positive electrode lead wire 41 is attached to the positive electrode 11, the positive electrode lead wire 41 and the positive current collector plate 1 may be separated due to deteriorated connection reliability if a contact area between the positive electrode lead wire 41 and the positive current collector plate 1 is equal to or lower than 10 $mm^2$. In addition, if the contact area is equal to or greater than 300 $nm^2$, a capacitance may be deteriorated. Thus, the contact area between the positive electrode lead wire 41 and the positive current collector plate 1 is preferably in the range of 10 $mm^2$ to 300 $mm^2$.

In addition, the positive electrode lead wire 41 is compressed to the positive current collector plate 1 after being stitched thereto. Here, if 3 or less pins are used for the stitching, the positive electrode lead wire 41 may be separated from the positive current collector plate 1. Also, if a pinhole generated by the stitching has a diameter of 0.2 mm or less, the stitching may be not suitably conducted, so the positive electrode lead wire 41 joined to the positive current collector plate 1 may be separated from it. In addition, if the pinhole has a diameter of 5 mm or above, the positive current collector plate 1 may be fractured. Thus, the pinhole generated during the stitching process is preferably in the range of 0.2 mm to 5 mm. In addition, if the positive electrode lead wire 41 is compressed to the positive current collector plate 1 at a pressure less than 0.3 Mpa, a stitched portion of the positive electrode lead wire 41 may have deteriorated contact reliability. In addition, a sharp end may be remained due to the stitching.

Thus, the positive electrode lead wire 41 is preferably compressed to the positive current collector plate 1 at 0.3 Mpa or above.

Meanwhile, the negative electrode 12 includes the negative current collector plate 3 composed of a common capacitor electrode, similarly to the positive electrode 11. In addition, a polarized electrode layer 2 composed of an activated carbon coating layer and a negative electrode lead wire 42 for sending charges' charged in the capacitor to outside are attached to the negative current collector plate 3.

Furthermore, the contact area, the number of pins used for stitching, and the diameter of the pinhole generated by the stitching, described in the explanation of the positive electrode 11, are identically applied to the negative electrode 12. In addition, with respect to the connection between the negative current collector plate 3 and the negative electrode lead wire 42, a surface area of the negative current collector plate 3, to which the negative electrode lead wire 42 is attached, is preferably free from the polarized electrode layer 4, similarly to the connection of the positive electrode lead wire 41. More preferably, a surface area of the negative current collector plate 3, opposite to the above surface area to which the negative electrode lead wire 42 is attached, may be free from the polarized electrode layer 4.

Figure 4:
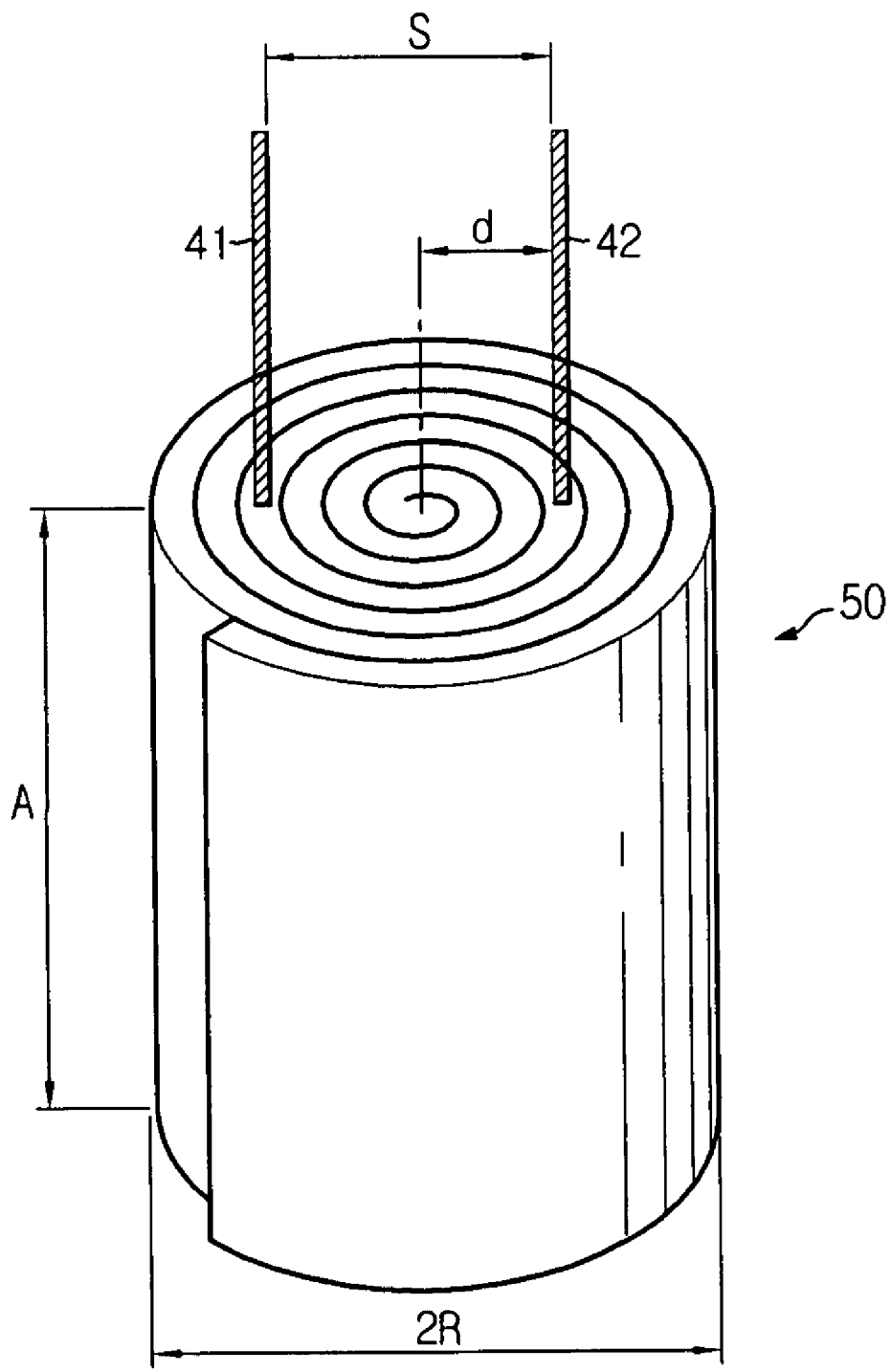
FIG. 4 is a perspective view showing a taken-up unit obtained by taking up an electrode provided to the electric double layer capacitor according to the preferred embodiment of the present invention.

FIG. 4 is a perspective view showing a taken-up unit obtained by taking up an electrode provided to the electric double layer capacitor according to the preferred embodiment of the present invention.

Referring to FIG. 4, the positive electrode 11, the negative electrode 12 and the separator 30 may be taken up to reconfigure them as a taken-up unit 50 in a roll shape. Here, the negative electrode 12 is preferably positioned relatively outer than the positive electrode 11 in the taken-up unit 50.

When the taken-up unit 50 is configured, if a surface distance of the separator 30 (e.g., a distance measured along the surface of the separator 30) between the positive electrode lead wire 41 and the negative electrode lead wire 42 is 0.3 cm or less, the positive electrode lead wire 41 and the negative electrode lead wire 42 may be contacted with each other after the taking-up process, which may result in a short circuit. In addition, if the surface distance is 30 cm or more, the positive electrode lead wire 41 and the negative electrode lead wire 42 may also be contacted with other after the taking-up process, which may also result in a short circuit. Thus, the surface distance between the positive electrode lead wire 41 and the negative electrode lead wire 42 is preferably in the range of 0.3 cm to 30 cm before the taking-up process.

In addition, if a space S between the positive electrode lead wire 41 and the negative electrode lead wire 42 after the taking-up process is 5 mm or less, both lead wires 41, 42 may be contacted with each other, which may cause a short circuit. In addition, if the space S is 30 mm or more, the positive electrode lead wire 41 and the negative electrode lead wire 42 may be contacted with an outer case, which may cause a short circuit. Thus, the space S between the positive electrode lead wire 41 and the negative electrode lead wire 42 after the taking-up process is preferably in the range of 5 mm to 30 mm.

Meanwhile, locations of the lead wires 41, 42 are determined according to the following equation 1. If the locations L of the lead wires 41, 42 are smaller than 0.1 or equal to or greater than 1, the lead wires 41, 42 may be short-circuited when being contacted with an external terminal. Thus, the locations L of the lead wires 41, 42 preferably satisfy the relation of $0.1 \leq L < 1$.

$$L = \sqrt{\frac{d^2 \pi A}{V}} \quad \text{Equation 1}$$

Here, d is a distance from a central axis of the capacitor to the positive electrode lead wire 41 or the negative electrode lead wire 42, V is a sum of volumes of the positive electrode 11, the negative electrode 12 and the separator 30, and A is a height of the capacitor.

Hereinafter, detailed explanation will be given based on experiments to show that the capacitor according to the present invention may keep a sufficient capacitance stably without any short circuit and also may ensure a low initial resistance value.

EXPERIMENTAL EXAMPLE 1

Five capacitors were configured according to the configuration shown in FIG. 3. When each capacitor was configured, an activated carbon coating was removed only from a region where a lead wire was to be joined to an electrode. In addition, a lead wire was joined to the electrode by using stitching and compressing at the same time. After that, the capacitors were taken up, and then average values of initial resistance values at 1 kHz, capacitances at a low current mode of 0.1A and capacitances at a high current mode of 3A were obtained.

EXPERIMENTAL EXAMPLE 2

Five capacitors were configured like the Experimental Example 1. But, the activated carbon coating was removed not only from a region where a lead wire was to be joined to an electrode but also from a region opposite to the above region. In addition, a lead wire was joined to the electrode by using stitching and compressing at the same time. After that, the capacitors were taken up, and then average values of initial resistance values and capacitances of the capacitors were obtained under the same conditions as the Experimental Example 1.

COMPARATIVE EXAMPLE 1

Five capacitors were configured like the Experimental Example 1. But, in a positive electrode and a negative electrode on which activated carbon was coated, the activated carbon coating was removed from a region where a lead wire was to be joined when each capacitor was configured. In addition, a lead wire was joined to the electrode by using stitching. After that, the capacitors were taken up, and then initial resistance values and capacitances of the capacitors were measured under the same conditions as the Experimental Example 1, and then their average values were obtained.

COMPARATIVE EXAMPLE 2

Five capacitors were configured like the Experimental Example 1. But, a activated carbon coating was not removed from a region where a lead wire was to be joined. In addition, a lead wire was joined to the electrode by using stitching and compressing at the same time. After that, the capacitors were taken up, and then average values of initial resistance values and capacitances of the capacitors were obtained under the same conditions as the Experimental Example 1.

The following table 1 shows average values of the capacitances and the initial resistance values of the capacitors, obtained through the Experimental Examples 1 and 2 and the Comparative Examples 1 and 2.

TABLE 1

| Average value | Capacitance [F] (@ 0.1 A) | Capacitance [F] (@ 3 A) | Initial resistance value [mΩ] (@ 1 kHz) | |
|---|---|---|---|---|
| Comparative example 1 | — | — | — | Short circuit |
| Comparative example 2 | 50.5 | 41 | 19.2 | |
| Experimental Example 1 | 50.2 | 46 | 10.3 | |
| Experimental Example 2 | 50 | 47 | 10.5 | |

Seeing Table 1, in case of the Experimental Examples 1 and 2 in which the activated coating was removed from a junction region of the lead wire, or both junction region of the lead wire and its opposite side, a capacitance of the capacitor was not so strikingly reduced. However, it would be found that the initial resistance value was significantly increased in the Comparative Example 2 in which the activated carbon coating was not removed. In addition, it would be also understood that, if the activated carbon coating is not removed (Comparative Example 2), a capacitance of the capacitor is significantly decreased in a high current mode.

In addition, though the activated carbon coating is removed (Comparative Example 1), it would be understood that a short circuit occurs if the lead wire is joined to the electrode only using stitching. If a lead wire is joined only using the stitching, the lead wire forms a sharp end, which damages the separator during the taking-up process and thus causes an electric connection.

Figure 5:
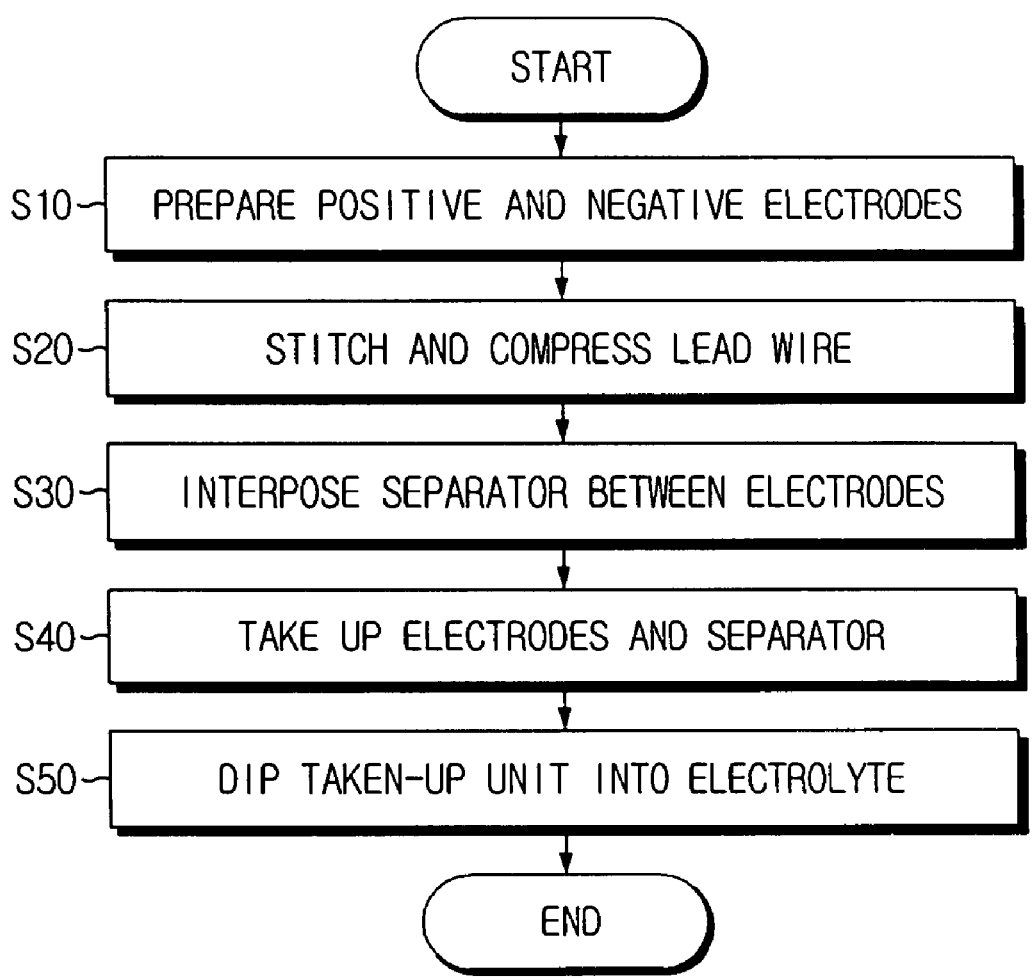
FIG. 5 is a flowchart illustrating a method for manufacturing an electric double layer capacitor according to a preferred embodiment of the present invention.

Hereinafter, a method for manufacturing an electric double layer capacitor according to a preferred embodiment of the present invention will be described with reference to the components of the above electric double layer capacitor together with FIG. 5.

First, a separator 30, a positive electrode 11 and a negative electrode 12 are prepared as components of an electric double layer capacitor (S10).

At this time, the positive electrode 11 and the negative electrode 12 are prepared in a way of forming polarized electrode layers 2, 4 on outer surfaces of a positive current collector plate 1 and a negative current collector plate 3, which are made of conductive material. Here, the polarized electrode layers 2, 4 are preferably composed of an activated carbon coating layer. After that, the polarized electrode layers 2, 4 are removed from surface regions of the positive and negative electrodes 11, 12 to which lead wires 41, 42 are to be joined. As an alternative, it is also possible that the polarized electrode layers 2, 4 are not formed on the regions to which the lead wires 41, 42 are to be joined, from the first.

Subsequently, the positive electrode lead wire 41 and the negative electrode lead wire 42 are respectively joined to a positive electrode junction portion 21 and a negative electrode junction portion 22 and then compressed thereto (S20). At this time, a junction area of the lead wire 41, 42 is controlled in the range of 10 mm² to 300 mm². In addition, the number of stitching pins is set to 3 or more. At this time, a stitching pinhole is set to have a diameter of 0.2 mm to 5 mm. Also, a compressing pressure is set to 0.3 Mpa or above. Reasons for the stitching conditions and the compressing conditions are already explained above.

Then, the separator 30 is interposed between the positive electrode 11 and the negative electrode 12, to which the lead wires are joined (S30). At this time, a spacing distance between the lead wires 41, 42 provided to the positive electrode 11 and the negative electrode 12 is controlled in the range of 0.3 cm to 30 cm. Reasons for this condition are already explained above. After that, the positive electrode 11, the negative electrode 12 and the separator 30 are taken up to form a taken-up unit 50 as shown in FIG. 4 (S41, S42). In addition, the taken-up device 50 is dipped into an electrolyte, and then sealed in a case to complete an electric double layer capacitor (S50).

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

The electric double layer capacitor and the lead wire connecting method of the electric double layer capacitor according to the present invention minimize reduction of a capacitance of the capacitor generated due to removal of an activated carbon coating by removing the activated carbon coating from junction regions of the electrodes and the lead wires in an optimized way.

In addition, by joining the lead wires by means of stitching junction or compressing junction, the present invention may minimize a contact resistance between the electrode and the lead wire and also improve contact reliability of the lead wire.

What is claimed is:

1. An electric double layer capacitor including a positive electrode and a negative electrode in each of which polarized electrode layers are formed on both surfaces of a current collector plate, a positive electrode lead wire and a negative electrode lead wire respectively connected to the positive and negative electrodes, a separator interposed between the positive and negative electrodes, and an electrolyte soaked into the separator, wherein a surface region of the electrode to which the lead wire is to be joined and a surface region which is opposite thereto are respectively free from the polarized electrode layers, and each lead wire is joined to the current collector plate by means of stitching and then compressed thereto, and wherein a location (L) of each lead wire, defined by the following equation, is equal to or greater than 0.1 but smaller than 1:

$$L = \sqrt{\frac{d^2 \pi A}{V}}$$

where d is a distance from a central axis of the capacitor to the positive or negative electrode lead wire, V is a sum of volumes of the positive electrode, the negative electrode and the separator, and A is a height of the capacitor.

2. The electric double layer capacitor according to claim 1, wherein the positive and negative electrodes to which the positive and negative electrode lead wires are respectively joined are arranged to be spaced apart by a predetermined distance based on the separator in a direction along which the positive and negative electrodes are symmetric, and wherein the separator and the electrodes are taken up along a length direction thereof into a roll shape.

3. The electric double layer capacitor according to claim 2, wherein a surface distance of the separator (i.e., a distance measured along a surface of the separator) between the negative electrode lead wire and the positive electrode lead wire is in the range of 0.3 cm to 30 cm.

4. The electric double layer capacitor according to claim 3, wherein a linear distance between the negative electrode lead wire and the positive electrode lead wire is in the range of 5 mm to 30 mm while the separator and the electrodes are taken up.

5. The electric double layer capacitor according to claim 4, wherein the negative electrode is positioned relatively outer than the positive electrode in the taken-up unit with a roll shape.

6. The electric double layer capacitor according to claim 5, wherein a contact area between each electrode and the positive or negative electrode lead wire is in the range of 10 $mm^2$ to 300 $mm^2$.

7. The electric double layer capacitor according to claim 6, wherein at least three stitching pins are provided to each lead wire junction region, and each pinhole has a diameter of 0.2 mm to 5 mm.

8. The electric double layer capacitor according to claim 7, wherein at least one positive or negative electrode lead wire is joined to each electrode.

9. The electric double layer capacitor according to claim 8, wherein the polarized electrode layer is an activated carbon coating layer.

* * * * *